United States Patent
Shiao et al.

(10) Patent No.: US 9,422,719 B2
(45) Date of Patent: Aug. 23, 2016

(54) ROOFING GRANULES COMPRISING BASE PARTICLES THAT ARE SINTERED AND HAVE AN INITIAL REFLECTANCE OF AT LEAST 0.25

(71) Applicant: CERTAINTEED CORPORATION, Malvern, PA (US)

(72) Inventors: Ming Liang Shiao, Collegeville, PA (US); Tihana Fuss, Stow, OH (US); Jennifer A. Millberg, Boston, MA (US)

(73) Assignee: CERTAINTEED CORPORATION, Malvern, PA (US)

(*) Notice: Subject to any disclaimer, the term of this patent is extended or adjusted under 35 U.S.C. 154(b) by 201 days.

(21) Appl. No.: 13/729,118

(22) Filed: Dec. 28, 2012

(65) Prior Publication Data

US 2013/0168616 A1 Jul. 4, 2013

Related U.S. Application Data

(60) Provisional application No. 61/581,602, filed on Dec. 29, 2011.

(51) Int. Cl.
| | |
|---|---|
| *B32B 5/16* | (2006.01) |
| *E04D 1/28* | (2006.01) |
| *C09C 3/06* | (2006.01) |
| *E04D 1/00* | (2006.01) |

(52) U.S. Cl.
CPC . *E04D 1/28* (2013.01); *C09C 3/063* (2013.01); *C01P 2004/60* (2013.01); *C01P 2006/60* (2013.01); *E04D 2001/005* (2013.01); *Y02B 80/34* (2013.01); *Y10T 428/2991* (2015.01)

(58) Field of Classification Search
CPC ............ Y10T 428/2991; Y10T 428/31; C01P 2004/60; C01P 2006/60; C09C 3/063
USPC .................................................. 428/403, 323
See application file for complete search history.

(56) References Cited

U.S. PATENT DOCUMENTS

| | | |
|---|---|---|
| 2,046,295 A | 6/1936 | Nichols |
| 2,197,895 A | 4/1940 | Nichols |
| 4,632,876 A | 12/1986 | Laird et al. |
| 4,717,614 A | 1/1988 | Bondoc et al. |
| 5,124,178 A | 6/1992 | Haenggi et al. |
| 6,933,007 B2 | 8/2005 | Fensel et al. |
| 7,238,408 B2 | 7/2007 | Aschenbeck et al. |

(Continued)

FOREIGN PATENT DOCUMENTS

| | | |
|---|---|---|
| WO | 9850635 | 11/1998 |
| WO | 2011082374 A1 | 7/2011 |
| WO | 2011082398 A1 | 7/2011 |

OTHER PUBLICATIONS

Technical Search, 1 page, 2011.

*Primary Examiner* — Holly Le
(74) *Attorney, Agent, or Firm* — Abel Law Group, LLP; Alexander H Plache

(57) ABSTRACT

A roofing product can include roofing granules, wherein the roofing granules include base particles and a coating covering the base particles. The base particles are sintered. The coating has a depth of penetration into an outside surface of at least about 0.5% of an average radius of the base particles. In an embodiment, the coating has a depth of penetration into an outside surface of at least about 2.5 microns into the base particles. Further included is a process of forming the roofing granules.

11 Claims, 4 Drawing Sheets

(56) References Cited

U.S. PATENT DOCUMENTS

| | | |
|---|---|---|
| 7,241,500 B2 * | 7/2007 | Shiao et al. .................. 428/402 |
| 7,641,959 B2 | 1/2010 | Joedicke |
| 8,034,432 B2 | 10/2011 | Joedicke |
| 2007/0065640 A1 | 3/2007 | Joedicke |
| 2008/0241472 A1 | 10/2008 | Shiao et al. |
| 2010/0151199 A1 | 6/2010 | Shiao et al. |
| 2010/0203336 A1 | 8/2010 | Shiao et al. |
| 2011/0081537 A1 * | 4/2011 | Sexauer et al. ............ 428/317.7 |
| 2011/0086201 A1 * | 4/2011 | Shiao et al. .................. 428/148 |
| 2011/0223385 A1 | 9/2011 | Shiao et al. |

* cited by examiner

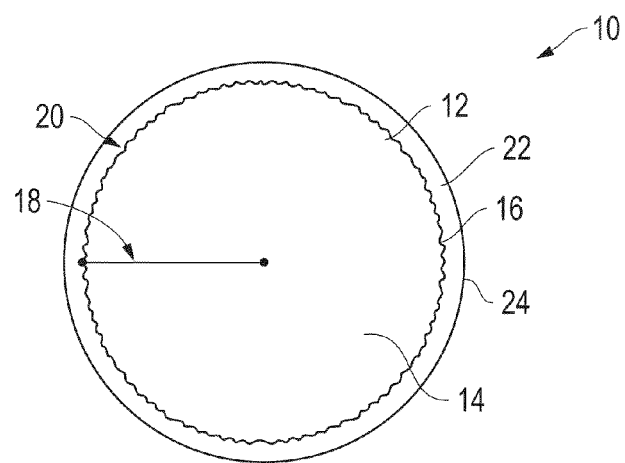
FIG. 1
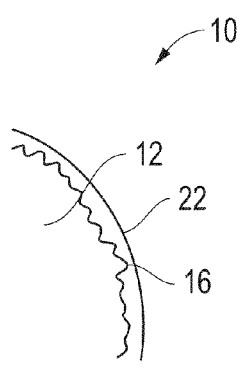   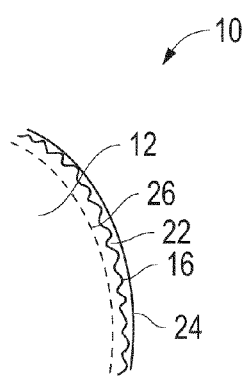   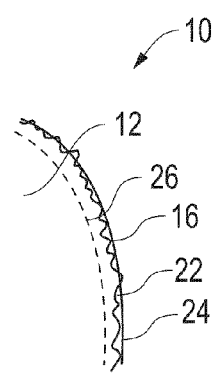
FIG. 2A          FIG. 2B          FIG. 2C

ROOFING GRANULES COMPRISING BASE PARTICLES THAT ARE SINTERED AND HAVE AN INITIAL REFLECTANCE OF AT LEAST 0.25

FIELD OF THE DISCLOSURE

The present disclosure relates to roofing granules and processes of forming the roofing granules and, more particularly, to roofing granules including bases particles and a coating covering the base particles and to processes of forming the roofing granules.

BACKGROUND

Roofing materials are susceptible to heating due to radiation emitted from the sun. Some roofing materials may reflect little near-infrared ("NIR") radiation and consequently absorb substantial solar heat. This absorption of solar heat typically results in elevated temperatures in the environment surrounding the exposed building material. The same or other roofing materials may have low emissivity which reduces the emission of absorbed heat. The absorbed solar heat, low emissivity, or both can increase the energy demand for HVAC in the building during summer months, as well as contribute to the Urban Heat Island effect and smog formation. The absorbed heat may also reduce the lifetime of the roofing materials.

Accordingly, there is a need for an improved roofing material that can reduce solar heat absorption.

SUMMARY

In an embodiment, a roofing product includes roofing granules, wherein the roofing granules include base particles, wherein the base particles are sintered; and a coating covering the base particles, wherein the coating has a depth of penetration into an outside surface of at least about 0.5% of an average radius of the base particles.

In another embodiment, a process of forming roofing granules includes providing sintered base particles; and forming a coating along an outside diameter of the base particles, wherein the coating has a depth of penetration into an outside surface of at least about 0.5% of an average radius of the base particles.

In yet another embodiment, a roofing product includes roofing granules, wherein the roofing granules include base particles, wherein the base particles are sintered; and a coating covering the base particles, wherein the coating has a depth of penetration into an outside surface of the base particles of at least about 2.5 microns into the base particles.

In still another embodiment, a process of forming roofing granules includes providing sintered base particles; and forming a coating along an outside diameter of the base particles, wherein the coating has a depth of penetration into an outside surface of at least about 2.5 microns into the base particles.

BRIEF DESCRIPTION OF THE DRAWINGS

Embodiments are illustrated by way of example and are not limited in the accompanying figures.

FIG. 1 includes an illustration of a cross-sectional view of a roofing granule in accordance with an embodiment described herein.

FIGS. 2A, 2B, and 2C include partial cross-sectional views of a roofing granule in accordance with an embodiment described herein.

Figure 3:
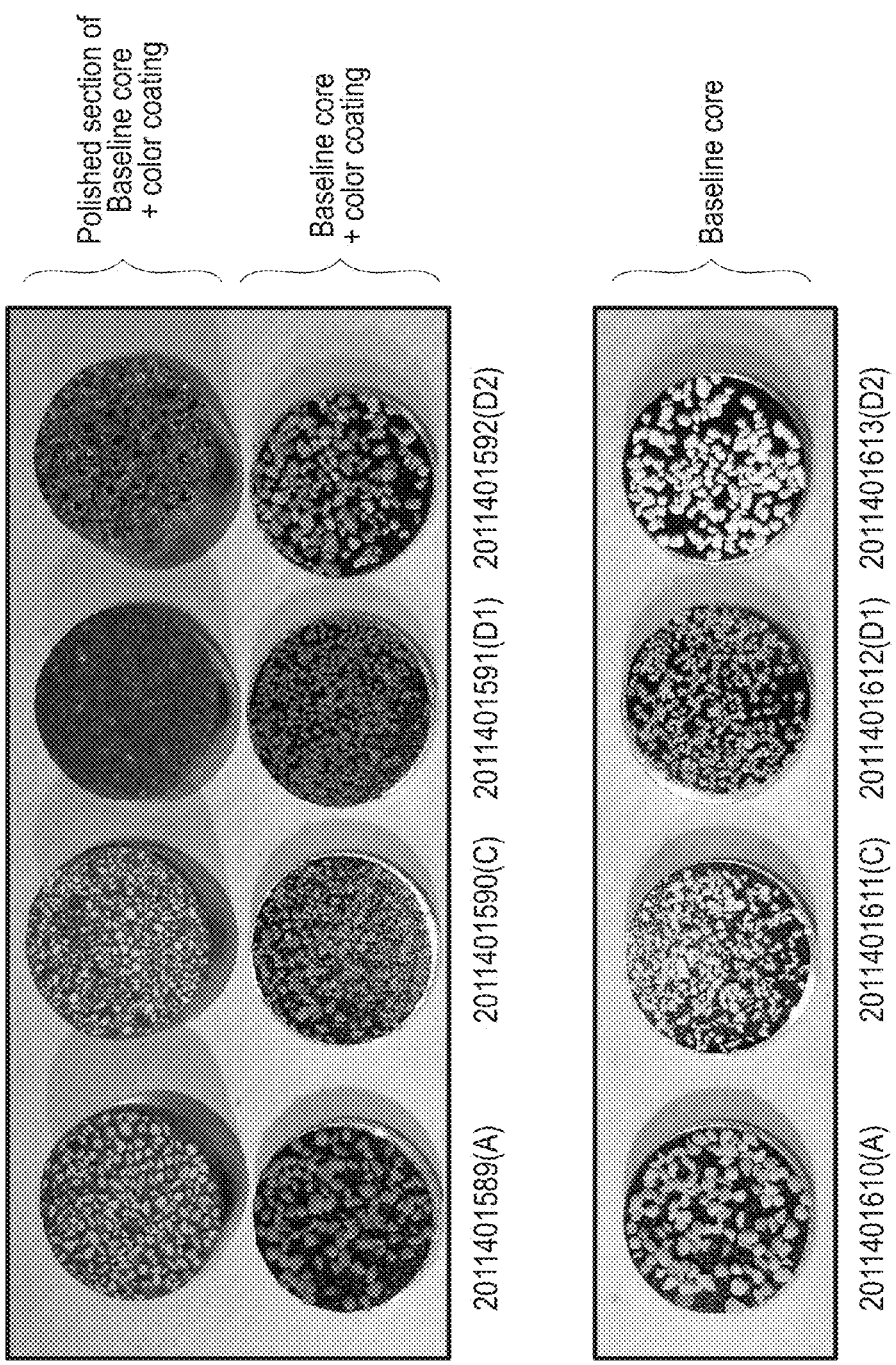
FIG. 3 includes photographic images of exemplary roofing granules and comparison roofing granules.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application.

Before addressing details of the embodiments described below, some terms are defined or clarified. The term "averaged" is intended to mean an average (i.e., an arithmetic mean), a median, or a geometric mean.

In this specification, color may be expressed as a color space that is specified by a set of 1976 CIE (Commission Internationale de L'Eclairage) color space coordinates of $L^*$, $a^*$, and $b^*$, wherein $L^*$ represents lightness of the color ($L^*=0$ is black, and $L^*=100$ indicates diffuse white; specular white may be higher), $a^*$ represents a position between red/magenta and green ($a^*$ negative values indicate green while positive values indicate magenta), and $b^*$ represents a position between yellow and blue ($b^*$ negative values indicate blue and positive values indicate yellow).

As used in the present specification and claims, "near infrared-reflective" and "solar heat-reflective" refer to reflectance in the near infrared range (700 to 2500 nanometers) of the electromagnetic spectrum. By "solar reflectivity" and "solar reflectance" is meant the quantity measured by ASTM C1549 with a solar spectrum reflectometer (Model SSR available from Devices and Services Inc., Dallas, Tex.), unless otherwise indicated.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in reference books and other sources within the structural arts and corresponding manufacturing arts.

The present invention provides a roofing product including roofing granules. The roofing granules include base particles, wherein the base particles are sintered. "Sintering" as used herein means the joining of particles through the application of heat. This commonly results in densification, but not in all cases. The roofing granules further include a coating covering the base particles. The base particles are generally described as spherical, however, skilled artisans will appreciate that the actual shape of the base particle can be irregular. The spherical shape as discussed is used to improve understanding of the concepts described herein. In particular, the base particles have a radius which is a measurement of a length from a center point in the sphere to an outside surface of the sphere. In an embodiment, the coating has a depth of penetration into the outside surface of at least about 0.5%, such as at least about 1.0%, or even at least about 2.0% of the average radius of the base particles. In an embodiment, the coating has a depth of penetration into the outside surface of not greater than about 10.0%, such as not greater than about 5.0%, or even not greater than about 4.0% of the average radius of the base particles. In an embodiment, the coating has a depth of penetration into an outside surface of at least about 2.5 microns, such as at least about 5 microns, or even at least about 10 microns of the base particles. In an embodiment, the coating has a depth of penetration into an outside surface of not greater than about 50 microns, such as not greater than about 25 microns, or even not greater than about 20 microns of the base particles. In a particular embodiment, the roofing product with the base particles and coating provides roofing granules that can be used to produce roofing membranes and shingles, with high solar reflectance, such as greater than about 0.25, such as greater than about 0.35, or even greater than about 0.40 as well as excellent UV opacity to protect the underlying substrate, and excellent outdoor durability for its long-term usage, as well as good fire resistance and mechanical strength. Any suitable substrate for roofing applications may be envisioned. In an embodiment, the substrate may be asphaltic, metallic, ceramic, polymeric, synthetic, or a combination thereof In an embodiment, the base particles, prior to coating, have a desirable solar reflectance. For instance, the solar reflectance of the base particles is at least about 0.25, such as at least about 0.30, such as at least about 0.35, such as at least about 0.40, or even at least about 0.50, as measured by ASTM C1549.

The base particles of the present invention are typically a ceramic-forming material. As used herein, the phrase "ceramic material" refers to the collection of granules of inorganic metal and non-metal, oxides, carbides and nitrides that have been formed into a sphere and sintered such that the individual granules adhere to one another thereby forming a sintered particle. In an embodiment, the ceramic material does not include volatile components, such as binders and liquids used to make the base particle, nor any polymers or other coatings that may be added to the particle after the sintering step. In one embodiment of this invention, the base particle contains at least a first metal oxide that includes oxides of aluminum and a second metal oxide that contains oxides of silicone and may include a third metal oxide that contains oxides of iron.

In an embodiment, the ceramic-forming material includes an aluminosilicate. Any reasonable aluminosilicate may be envisioned. In an embodiment, the aluminosilicate is a mineral including, but not limited to, aluminum, silicon and oxygen. In a particular embodiment, the aluminosilicate includes: (a) aluminum silicates such as naturally occurring minerals such as adalusite, kyanite, mullite, and sillimanite, having the composition $Al_2SiO_5$; (b) layered hydrous aluminum silicates such as kaolinite, $Al_2Si_2O_5(OH)_4$, halloysite $Al_2(Si_2O_5)(OH)_4.2H_2O$, pyrophyllite $Al_2(Si_2O_5)_2(OH)_2$, montmorillonite $(Al_{1.67}Na_{0.33}Mg_{0.33})(Si_2O_5)_2(OH)_2$, mica $Al_2K(Si_{1.5}Al_{0.5}O_5)_2(OH)_2$, and illite $Al_{2-x}Mg_x K(Si_{1.5-y}Al_{0.5+y}O_5)_2(OH)_2$; (c) clays including layered hydrous aluminum silicates such as kaolin clays; (d) bauxites including the minerals gibbsite $Al(OH)_3$, boehmite gamma-$AlO(OH)$, diaspore alpha-$AlO(OH)$ and/or corundum; and (e) feldspars such as orthoclase, $[(K, Na)AlSi_3O_8]_4$, albite $[NaAlSi_3O_8]_4$, and anorthite, $Ca[Al_2Si_2O_8]$; and any combination thereof. In a particular embodiment, the aluminosilicate is a bauxite.

In an embodiment, the ceramic-forming material includes at least one aluminosilicate, and can include uncalcined, partially calcined, or calcined clay. Examples of other ceramic-forming materials that can be employed in the process of the present invention include bauxite clays, including low iron bauxites, kaolinitic clays such as china clays, ball clays, fireclays, and flint clays, Dover clay, diaspore clay, burley clay, kaolin clays, blends, and mixtures thereof. For example, blends of kaolin clay and bauxite can be used. Examples of ceramic-forming materials that can be used include sillimanite minerals (63% $Al_2O_3$ and 37% $SiO_2$) which form ceramics having similar composition, as well as bauxite, in particular, bauxite having a low level of iron oxide or hematite. Clays employed in the present process can be beneficiated by flotation, selective flocculation, magnetic separation, degritting, delamination, leaching, and like processes. Further, mixtures of one or more aluminosilicates and other mineral species can be employed.

In addition to the at least one aluminosilicate, the ceramic-forming material, can include small amounts of other minerals. For example, the ceramic-forming material can include small amounts of other minerals selected to further increase the solar heat reflectance of the sintered ceramic-forming material. In particular, small amounts of microcrystalline silica, such as novaculite, can be mixed with kaolin clay to form the ceramic-forming material. By "small amounts" is meant less than about five percent by weight of the total weight of the base particles. Further, small amounts of titanium dioxide can be used to form the ceramic-forming material, although the presence of titanium dioxide in the sintered ceramic-forming material is not essential to achieving high solar heat-reflectance.

The at least one aluminosilicate, ceramic-forming material, can also include a small amount of one or more mineral materials that act as sinter aids or fluxes during the sintering process. Thus, the ceramic-forming material can include one or more sintering aids such as bentonite clay, iron oxide, boron, boron carbide, aluminum diboride, boron nitride, boron phosphide, other boron compounds, and/or fluxes, such as sodium carbonate, lithium carbonate, feldspar, manganese oxide, titania, iron oxide, or sodium silicates.

In an embodiment, various types of stone dust can also be employed to prepare the base particles. Stone dust is a natural aggregate produced as a by-product of quarrying, stone crushing, machining operations, and similar operations. The base particles can include sintered ceramic particles or mineral particles of the type typically used for making roofing granules, such as talc, slag, limestone, granite, syenite, diabase, greystone, slate, trap rock, basalt, greenstone, andesite, porphyry, rhyolite, and greystone, or other naturally occurring metamorphic rocks, crushed ceramic particles, sands, gravels, or any particles which are both UV opaque and thermally stable at temperatures greater than 900° Celsius. Mineral particles of the type typically used for making roofing granules, while providing good resistance to UV radiation, generally have low solar heat reflectance, that is, low reflectance of near infrared radiation.

In one embodiment of the present invention, the starting material for the base particles that includes particles of the ceramic-forming material, are agglomerated. For instance, suitable base particles can be prepared by comminuting suitable minerals to an average size less than that suitable for use in roofing granules to thus form small particles, and subsequently agglomerating these small particles to form base particles. Base particle binder can be included to provide mechanical strength to the agglomerated particles forming base particles. If desired, a binder can be added to increase the mechanical strength of the base particle. Any reasonable binder may be used. Exemplary binders include a starch, a resin, a wax, gelatinized cornstarch, calcium carbonate, polyvinyl alcohol, silicate, silica, phosphate, titanate, zirconate, and aluminate binders, mixtures, or combinations thereof. In an embodiment, the binder is added at about 0-6% by weight, based on the total weight of the base particle. In an embodiment, the base particles may have a core composition that may be the same or different than the outside surface of the base particle. For instance, the base particles may include a ceramic-forming material as the core with an outside surface of ceramic-forming materials that is different than the core. In an embodiment, the base particles may include a ceramic-forming material as the core with an outside surface of ceramic-forming materials that is the same as the core.

Other functional additives, such as colorants, algaecides, biocides, or nano-$TiO_2$ can be added to the ceramic-forming material to provide additional functionalities, such as aesthetics, biocidal effects, self-cleaning, and/or nitrogen oxides reduction. Any reasonable functional additive is envisioned depending on the desired properties of the final roofing granule.

In an embodiment, the base particles have a particle size between #6 and #50 U.S. mesh, such as a particle size between #8 and #50 U.S. mesh. Exemplary base particles include roofing base granules with a particle size between #10 and #40 U.S. mesh or algae-resistant roofing granules. In an embodiment, the base particles have an average diameter of about 0.5 to about 2.0 mm, such as about 1.0 mm to about 2.0 mm. In an embodiment, the base particles have a water absorption of about 3.0 wt. % to about 15.0 wt. %.

The base particles of the present invention are typically prepared by sintering the base particles. Sintering includes heating the ceramic-forming material at temperatures from about 900° Celsius to about 1450° Celsius. In an embodiment, the ceramic-forming material, such as the aluminosilicates, may be homogenously distributed within the base particle or heterogeneously distributed within the base particle. "Homogenous distribution" includes a substantially uniform concentration of the crystalline species containing, but not limited to, aluminum, silicone, iron, or combination thereof, throughout the base particle. "Heterogeneous distribution" includes a higher concentration of at least one crystalline species containing, but not limited to, aluminum, silicon, iron, or combination thereof, within at least a portion of the base particle. In an embodiment, the base particles are sintered to have a surface morphology that is porous. "Porous" as used herein refers to cavities on the base particles that permit movement of the coating within at least the outside surface of the base particles. Porosity of the base particles provides a surface morphology that will advantageously absorb the liquid coating, such that the resultant particles can have both aesthetically pleasing appearance with apparent coating uniformity, particularly when processed by conventional pan coating techniques, and improved solar reflectance. For instance, the outside surface of the base particle has a surface texture that includes peaks and valleys as well as microscopic channels. If the base particles have too low a porosity, the coating may not uniformly cover the outside surface of the base particles. If the base particles have too high a porosity, excess coating may be absorbed into the outside surface of the base particles. With a porosity as described, the coating has a depth of penetration into the outside surface of at least about 0.5%, such as at least about 1.0%, or even at least about 2.0% of the average radius of the base particles. In an embodiment, the coating has a depth of penetration into the outside surface of not greater than about 10.0%, such as not greater than about 5.0%, or even not greater than about 4.0% of the average radius of the base particles. In an embodiment, the coating has a depth of penetration into the outside surface of at least about 2.5 microns, such as at least about 5 microns, or even at least about 10 microns of the base particles. In an embodiment, the coating has a depth of penetration into the outside surface of not greater than about 50 microns, such as not greater than about 25 microns, or even not greater than about 20 microns of the base particles. In an embodiment, the coating has an outer portion that does not penetrate into the outside surface of the base particles. In a particular embodiment, the outer portion of the coating has an average thickness of about 0.5 microns to about 10 microns, such as about 1 micron to about 5 microns. In an embodiment, the coating has a total average thickness of about 5 microns to about 50 microns.

The coating over the particle includes a reasonable material that provides a solar reflectance of greater than about 0.25, such as greater than about 0.35, or even greater than about 0.40. In a particular embodiment, the coating has an $L^*$ value less than about 50, as measured by a CIE LAB color scale. For instance, the coating provides earth-tone colors for the resulting roofing granule. In an embodiment, the coating directly overlies the base particles. For instance, there is no intermediate layer or material that lies between the coating and the base particle. In an embodiment, the coating includes a metal silicate, a silicone, a fluoropolymer, a polysiloxane, an acrylic, a urethane, an epoxy, a silica, a sol-gel, a phosphate, a metal oxide, a powder, a thermal spray, or combination thereof. In a particular embodiment, the base particles are colored using metal oxide coating pigments. Examples of coatings pigments that can be used include those provided by the Color Division of Ferro Corporation, 4150 East 56th St., Cleveland, Ohio 44101, and produced using high temperature calcinations, including PC-9415 Yellow, PC-9416 Yellow, PC-9158 Autumn Gold, PC-9189 Bright Golden Yellow, V-9186 Iron-Free Chestnut Brown, V-780 Black, V0797 IR Black, V-9248 Blue, PC-9250 Bright Blue, PC-5686 Turquoise, V-13810 Red, V-12600 Camouflage Green, V12560 IR Green, V-778 IR Black, and V-799 Black. Further examples of coatings pigments that can be used include white titanium dioxide pigments provided by Du Pont de Nemours, P.O. Box 8070, Wilmington, Del. 19880. Such metal oxide pigments may be dispersed in a binder including a mixture of an alkali metal silicate, such as aqueous sodium silicate, and a heat-reactive aluminosilicate material, such as clay. In a particular embodiment, the heat-reactive aluminosilicate material is kaolin clay. Typically, the proportion of alkali metal silicate to heat-reactive aluminosilicate material is from about 3:1 to about 1:3 parts by weight alkali metal silicate to parts by weight heat-reactive aluminosilicate material, such as about 2:1 to about 0.8:1 parts by weight alkali metal silicate to parts by weight heat-reactive aluminosilicate material. In an embodiment, the alkali metal silicate can be aqueous sodium silicate solution having a total solids content of from about 38 percent by weight to about 42 percent by weight, based on the total weight of the coating, and having a ratio of $Na_2O$ to $SiO_2$ of from about 1:2 to about 1:3.25.

In an embodiment, the coating further includes a binder, water, a curing agent, at least one colorant, a viscosity modifier, an anti-microbial additive, a pigment spacer, an opacifier, a matting agent, or combination thereof. In an embodiment, the anti-microbial additive is cuprous oxide. In an embodiment, the colorant may be a pigment, a dye, or combination thereof. Further, the coating has a viscosity that is advantageous to provide a continuous coating on the base particle. For instance, the viscosity allows the coating to flow over the base particles. The viscosity is typically from about 50 centipoise to about 5000 centipoise, such as about 500 centipoise to about 2000 centipoise. A "continuous coating" as used herein refers to a uniform coating that coats at least about 80%, such as at about 90% of the outside surface of the base particles, such as at least about 95% of the outside surface of the base particles. In contrast, a non-continuous coating manifests "bald spots" on base particles where the coating is non-uniform and the outside surface of the base particles can be visualized with an optical microscope at 10× magnification.

Turning to a process of forming the roofing granules, roofing granules as described above are provided. Specifically, the roofing granules are sintered to provide the surface morphology that is porous. Prior to sintering, the aluminosilicate may be subjected to a series of conventional operations, including blunging, degritting, classifying, magnetically separating, flocculating, filtrating, redispersing, spray drying, pulverizing, comminuting, and calcining. Subsequently, the beneficiated clay is mixed with a suitable binder, such as polyvinyl alcohol, and the mixture is delivered to an intensive mixer, such as an Eirich mixer, where the binder and clay mixture is formed into generally spherical "green" or uncured granules or base particles. The resulting green granules or base particles are then dried and then classified by dropping them through a series of screens of varying mesh sizes. The base particles are typically dried to a moisture content of less than about 10 weight percent, usually in a drier at about 100° C. to about 300° C. The base particles are then sintered by heating them in a suitable kiln or oven at a temperature to form a surface morphology on the outside of surface of the base particles that is porous. As discussed above, the base particles are sintered to a temperature of about 900° Celcius to about 1450° Celcius to achieve a porous surface morphology.

The finished roofing granules can be spherical (i.e., have an average sphericity value of about 0.75 or greater, more preferably, at least 0.80, and typically, 0.80-0.9). In an embodiment, the finished roofing granules can be non-spherical. The base particles may then be screened. The screen sizes can be selected to provide a roofing granule mixture with a desired, predetermined particle-size distribution. In a particular embodiment, the particle-size distribution of the granules is selected to maximize coverage, and hence protection, of the roofing product in which the granules are embedded. For example, the granules can be screened to provide at least about 85 percent, such as at least about 95 percent, or even at least about 97 percent surface coverage, when the roofing granules are embedded in a bituminous surface or other surface. In order to maximize surface coverage, a bimodal or polymodal particle-size distribution can be selected. Any reasonable ratio of particle-size distribution may be envisioned. When a bimodal particle-size distribution is selected, the ratio of the two maxima in the particle-size distribution may be selected to maximize coverage of the bituminous surface such that the smaller particles tend to fill the interstices between the larger particles. In an embodiment, the ratio of the maxima of the smaller size granules to the maxima of the larger size granules is from about 0.22 and 0.5, which is alternatively expressed as the ratio of the maxima of the larger size granules to the smaller size granules of about 4.5 to 2.

In an embodiment, the coating may be applied on the base particles by any reasonable means. For instance, forming the coating includes pan coating, spray coating, fluidized bed coating, dip coating, powder coating, thin film coating, or combination thereof. In a particular embodiment, the coating may be applied by pan coating. Pan coating includes placing the sintered base particles in the viscous coating and agitating the particles and coating until a continuous coating is formed on the base particles. In an embodiment, the coating is present at about 1.0 wt. % to about 10.0 wt. % greater than the water absorption of the base particles, such as about 2.0 wt. % to about 6.0 wt. % greater than the water absorption of the base particles.

Once the base particles are intermixed with the coating to provide the continuous coating, the coated base particles may be heated. In an embodiment, the coating is heated on the base particles to a temperature to activate the heat-reactive aluminosilicate material in the coating. For instance, the coated base particles are fired at an elevated temperature by any suitable means. For instance, the coated base particles are heated in a rotary kiln. In an embodiment, the coated base particles are fired at an elevated temperature, such as at least about 200° Celsius, such as about 300° Celsius to about 600° Celsius, such as about 450° Celcius to about 550° Celcius. At the elevated temperature, the heat-reactive aluminosilicate material reacts with and neutralizes the alkali metal silicate, thereby insolubilizing the binder.

Turning to FIG. 1, the granule 10 includes is a base particle 12 that includes an interior core 14, an outside surface 16, and a radius 18. "Radius" is defined as a geometric center of an averaged size base particle 12 to the outside surface 16. Although illustrated with the interior core 14 that is the same as the outside surface 16, the interior core 14 and the outside surface 16 may be different material. The outside surface 16 of the base particle 12 includes pores 20. The outside surface 16 of the base particle 12 is continuously covered with a coating 22. As illustrated, the coating penetrates into the pores 20. The coating 22 has an outer portion 24 that does not penetrate into the outside surface 16 of the base particle 12.

Turning to FIGS. 2A, 2B, and 2C, a partial section of granule 10 includes a base particle 12. As illustrated, an outside surface 16 has a surface texture. In an embodiment and as seen in FIG. 2A, the coating 22 does not penetrate into the outside surface 16 of the base particle 12. In another embodiment and as seen in FIG. 2B, the coating 22 penetrates into the outside surface 16 of the base particle 12 and can been seen as the dashed line 26. Further, the outer portion 24 of the coating 22 extends beyond the surface texture of the outside surface 16. In yet another embodiment and as seen in FIG. 2C, the coating 22 penetrates into the outside surface 16 of the base particle 12 and can been seen as the dashed line 26.

Further, the coating 22 does not extend beyond the surface texture of the outside surface 16.

The roofing granule advantageously provides a desirable solar reflectance as well as other desirable properties. As stated earlier, the roofing granules of the present invention provide a base particle and a coating have a solar reflectance of greater than about 0.25, such as greater than about 0.35, or even greater than about 0.40. Further, the roofing granule has excellent UV opacity to protect an underlying asphalt substrate, and excellent outdoor durability for its long-term usage, as well as good fire resistance and mechanical strength. In an embodiment, the UV opacity is at least greater than about 70%, such as at least greater than about 80%, such as at least greater than about 90%, or even at least greater than about 95%. In an embodiment, the roofing granule has a desirable delta solar reflectance ($\Delta SR$). The $\Delta SR$ is defined herein as the difference between the SR of the base particle minus the SR of the roofing granule. In an embodiment, the $\Delta SR$ is less than about 0.20, such as less than about 0.18, or even less than about 0.15.

The solar heat-reflective roofing granules of the present invention can be employed in the manufacture of roofing products, such as asphalt shingles and bituminous membranes, using conventional roofing production processes. Any reasonable roofing product is envisioned. Examples of suitable bituminous membranes for use in the process of the present invention include asphalt roofing membranes such as asphalt-based, self-adhering roofing base sheet available from CertainTeed Corporation, Valley Forge, Pa., for example, Flintlastic® SA Cap, a base sheet which is impregnated with rubberized asphalt.

Typically, bituminous roofing products are sheet goods that include a non-woven base or scrim formed of a fibrous material, such as a glass fiber scrim. The base is coated with one or more layers of a bituminous material such as asphalt to provide water and weather resistance to the roofing product. One side of the roofing product is typically coated with mineral granules to provide durability, reflect heat and solar radiation, and to protect the bituminous binder from environmental degradation. In an embodiment, the roofing granules of the present invention can be substituted for conventional roofing granules. In one aspect of the process of the present invention, the roofing granules applied on the roofing material may be the same or different material. For instance, the roofing granules may have differing average particle size. In another aspect of the process of the present invention, the highly solar heat-reflective roofing granules are employed with other types of roofing granules, such as conventionally colored roofing granules to enhance the solar reflectance of colored roofing sheet materials, and/or with algae resistant roofing granules, in order to provide resistance to algae growth on the roofing surface.

Any conventional method may be used to apply the roofing granules to produce the bituminous roofing product. In an embodiment, the roofing granules can be applied to the upper surface of the bituminous roofing sheet material, such as while the bituminous material is sufficiently soft and deformable (for example, when the temperature of the bituminous material is greater than about 300° Fahrenheit, or about 150° Celsius) so that the roofing granules will strongly adhere to the bituminous material on cooling. In an embodiment, the surface of the roofing material may be treated. For instance, a mineral oil may be placed on the roofing material for dust control. In an embodiment, the surface of the roofing material may be treated with an adhesion promoter, a liquid binder, a silicone emulsion, or a combination thereof to increase the adhesion of the roofing granules to the roofing material. In an embodiment, the roofing granules may have a liquid binder applied thereon to improve the adhesion of the roofing granules to the roofing material. In a particular embodiment, the roofing granule is applied to a roofing sheet product by conventional means, such as dropping at a metered application rate from an overhead hopper. If desired, the roofing granules can be pressed using any reasonable means, such as a pressure roll, into the upper surface of the roofing sheet material in order to securely embed the roofing granules in the upper surface of the roofing sheet material. The roofing sheet product then may be rolled, or cut into roofing shingles, which are subsequently packaged. Any suitable roofing sheet material, i.e. substrate, for roofing applications may be envisioned. In an embodiment, the substrate may be asphaltic, metallic, ceramic, polymeric, synthetic, or a combination thereof. In an embodiment, the roofing product may be shingle, tile, or membrane.

In yet another aspect of the present invention, the roofing granules of the present invention can be applied to existing roofing surfaces, in the field, to provide enhanced solar heat-reflectance. In this case, the roofing granules may be dispersed in a suitable coating binder, such as an acrylic aqueous latex material to form a curable, film-forming coating composition, or roof mastic, which can be applied to the existing roofing surface by a suitable technique, such as by spray or mopping the coating composition onto the surface, and then allowing the coating composition to dry and cure. Alternatively, a suitable coating binder can be applied to a roof and the granules subsequently applied before the coating has cured or set to a solid state.

The following examples are provided to better disclose and teach processes and compositions of the present invention. They are for illustrative purposes only, and it must be acknowledged that minor variations and changes can be made without materially affecting the spirit and scope of the invention as recited in the claims that follow.

EXAMPLES

Example 1

Sample A 500 gm of calcined and sintered Alumino Silicate particles (available from Saint Gobain Proppants, Stow, Ohio) having particle size distribution between US mesh #10 and US mesh #40 are coated with a color coating including 12.50 gm of metal silicate (Grade 40 from Oxychem Co., Dallas, Tex.); 3.23 gm of kaolin clay, 0.65 gm of brown pigment (CI pigment brown 29), 0.15 gm of blue pigments (CI pigment blue 29), 0.93 gm of $TiO_2$ pigment; 0.58 yellow pigment (CI pigment yellow 164); 0.85 gm of brown pigments (CI pigment brown 24); and 0.68 green pigments (CI pigment green 18). The base particles have an initial solar reflectance of 0.52 prior to coating, as measured by the ASTM C1549 test method. The properties of the base particles before and after coating are listed in Table 1.

The coating is first prepared by mixing all the ingredients in a plastic cup via electronic stirrer until a uniform mixture is formed. The coating is then added to the particles in a pan coater and then is blended together for 5 minutes until the particles are uniformly coated. The coated particles are then heat treated in a rotary kiln at exiting temperatures of approximately 500° C.

The resultant granules have a desirable uniform, dark color and a solar reflectance of 0.365.

Example 2

Sample D2

500 gm of roofing granules having averaged solar reflectance of 0.55 (Bright White granules available from Certain-Teed Corp., Norwood, Mass.) are coated with the same coating as described in Example 1. The properties of the particles prior to coating are also listed in Table 1. The roofing granules prior to coating have a particle size distribution between US mesh #8 and US mesh #40.

The resultant granules (see data in Table 1) have a less uniform and lighter color comparing to the granules of Example 1. The color coating penetration depth is also much smaller.

Example 3

Sample C 500 gm of crushed porcelain grog (HLC14×48, available from Maryland Refractories, Irondale, Ohio) is coated with the same coating materials and process as described in Example 1. The particles prior to coating have an initial solar reflectance of 0.603 and the color noted in Table 1. The particles have particle size distribution of passing US mesh #12 and retaining on US mesh #50.

The coated granules have a lighter color and less desirable color appearance than the granules obtained in Example 1.

Example 4

Sample D1

500 gm of naturally occurring sands (Trowel Rite quartz granules from Clifford Estes Co., Totowa, N.J.) having particle size distribution between US mesh #16 and US mesh #40 are coated with the same coating process as listed in Example 1. The particles have an initial solar reflectance of 0.598 as show in Table 1.

After the coating, the said particles have a darker color appearance. However, the resulted solar reflectance is lower than Examples 1-3.

TABLE 1

| | Particle data before coating | | | | Particle data after color coating | | | |
|---|---|---|---|---|---|---|---|---|
| Example | L* | a* | b* | Avg. SR | L* | a* | b* | Avg. SR |
| 1 (A) | 66.63 | 5.21 | 18.93 | 0.520 | 43.47 | 3.3 | 8.22 | 0.365 |
| 2 (D2) | 83.54 | −0.64 | 0.28 | 0.554 | 49.82 | 2.38 | 6.05 | 0.332 |
| 3 (C) | 79.42 | 0.99 | 8.63 | 0.603 | 49.04 | 2.58 | 7.11 | 0.388 |
| 4 (D1) | 74.68 | 2.62 | 11.35 | 0.598 | 38.56 | 2.26 | 5.56 | 0.317 |

TABLE 2

| Example | ΔSR |
|---|---|
| 1 (A) | 0.155 |
| 2 (D2) | 0.222 |
| 3 (C) | 0.214 |
| 4 (D1) | 0.281 |

As seen in Table 2, Example 1 has the lowest ΔSR compared to Examples 2-4.

Photographic images are taken of the above base particles and roofing granules at low magnification. The base particles and roofing granules are placed on a standard SEM disk having a diameter of 25 mm. Images can be seen in FIG. 3.

Figure 4:
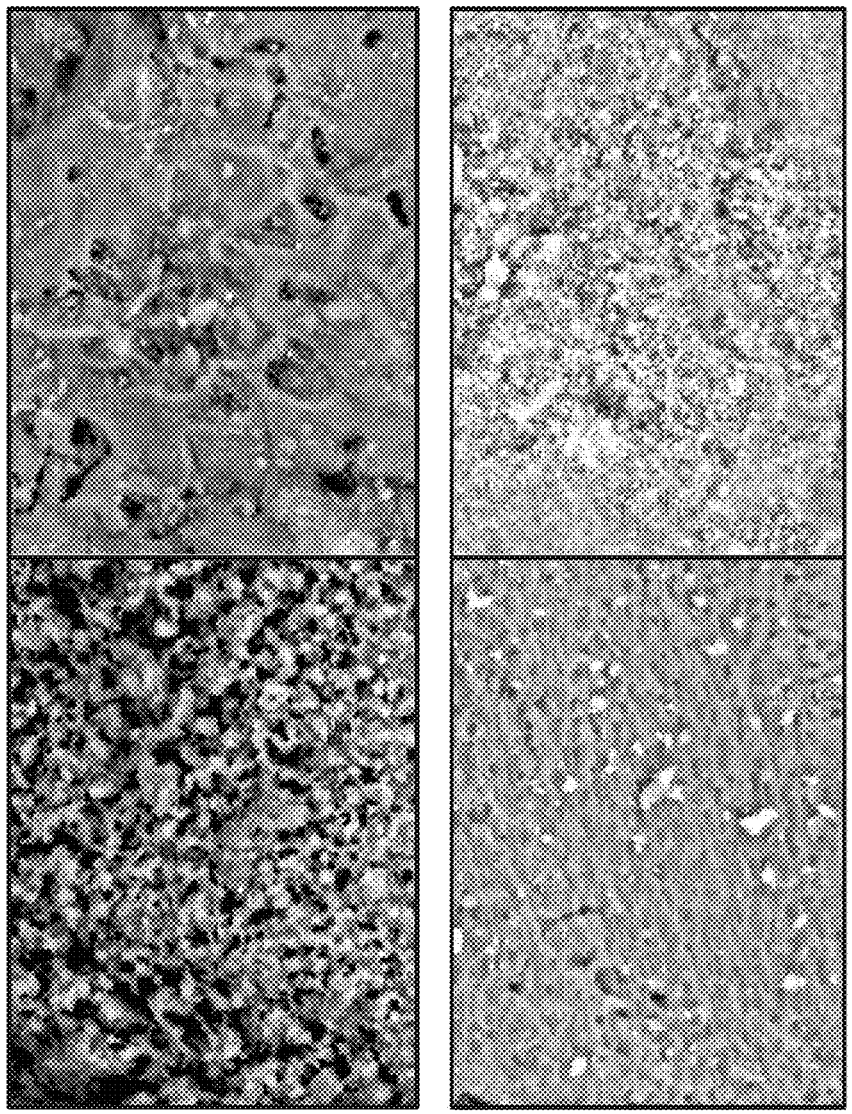
FIG. 4 includes scanning electron microscopy (SEM) images of exemplary base particles and comparison base particles.

Scanning electron microscopy images are taken of the above four base particles at 5000× magnification prior to coating. Images can be seen in FIG. 4. The sintered base particles of Sample 1 have a microscopic morphology that has a multitude of peaks and valleys compared to the particles of Examples 2, 3, and 4. Notably, the top left image is Example 1(A), the top right image is Example 3 (C), the bottom left image is Example 4 (D1), and the bottom right image is Example 2 (D2).

Figure 5:
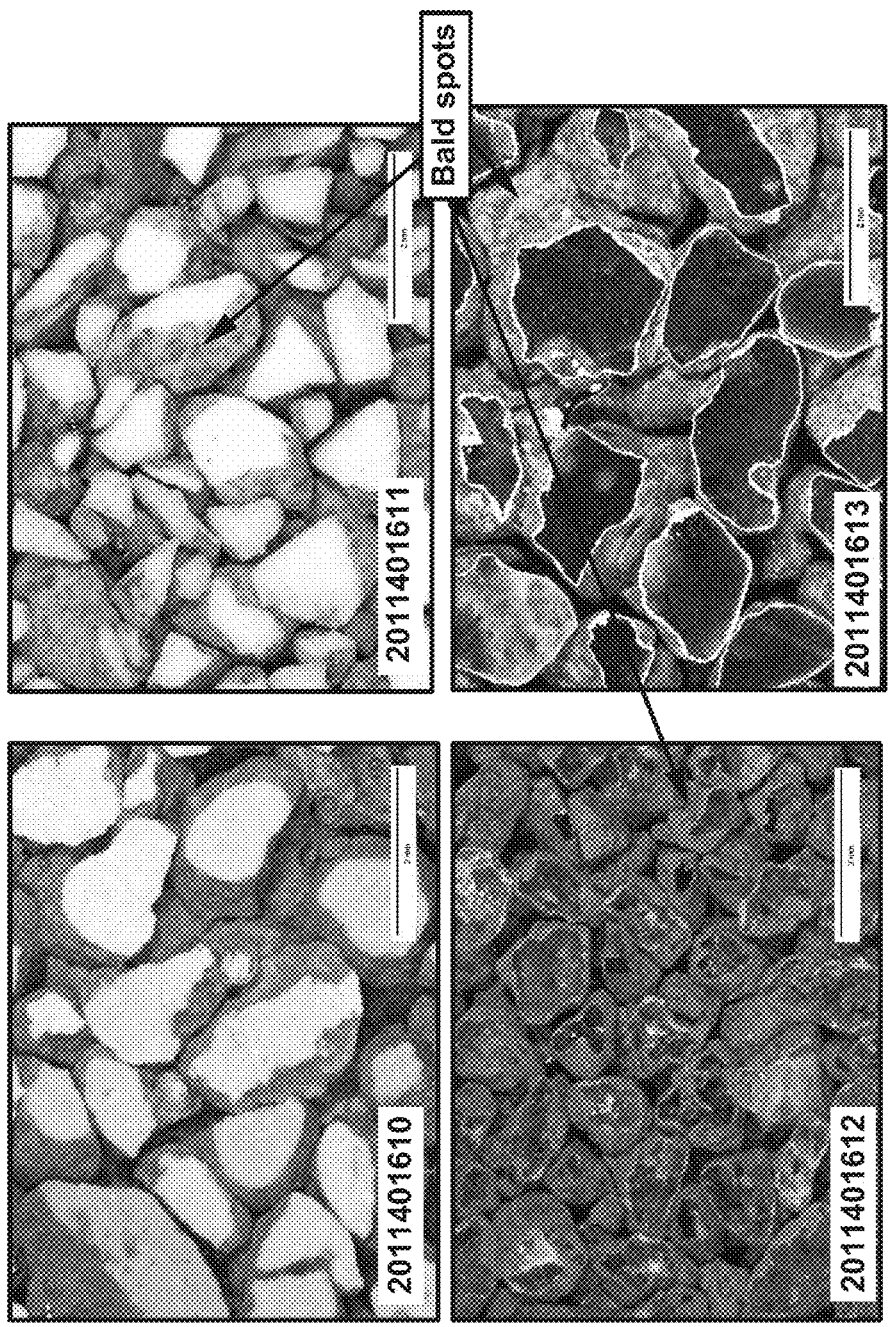
FIG. 5 includes optical microscope images of exemplary roofing granules and comparison roofing granules.

Images of optical micrographs of polish cross-sections after coating the base particles can be seen in FIG. 5. Notably, the top left image is Example 1(A), the top right image is Example 3 (C), the bottom left image is Example 4 (D1), and the bottom right image is Example 2 (D2). Clearly, bald spots where the coating has not coated continuously on base particles can be seen in Samples 2, 3, and 4. Accordingly, the coating on Example 1 is more continuous and uniform than the comparison Examples 2, 3, and 4. Not wanting to be bound by theory, the pan coating process can wipe coating off of high peaks on the granule cores, leaving non-uniform coverage of the granule body. With porous granule bodies, such as sintered ceramic granules of the invention, the coating can penetrate into the surface and effectively yield continuous or near continuous coverage and thus a more uniform coating coverage. Further, due to proximity of the solar reflective granule core to the surface of the coated granule, it presents a higher contribution to the solar reflectance while still being covered by the color coating.

Certain features, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A roofing product comprising roofing granules, wherein the roofing granules comprise:
   base particles, wherein the base particles are sintered and have a solar reflectance of greater than about 0.25, as measured by ASTM C1549; and
   a coating covering the base particles, wherein the coating has a depth of penetration into an outside surface of the base particles of at least about 0.5% of an average radius of the base particles and wherein a solar reflectance of the coated base particles is decreased by about 0.20 or less, compared to the base particle without the coating.

2. The roofing product of claim 1, wherein the coating has a depth of penetration not greater than about 10.0%.

3. The roofing product of claim 1, wherein the base particles are sintered to provide a porous surface morphology.

4. The roofing product of claim 1, wherein the coating has a total average thickness of about 5 microns to about 50 microns.

5. The roofing product of claim 1, wherein the roofing granules have a solar reflectance of greater than about 0.25.

6. The roofing product of claim 1, wherein the base particles have a water absorption of about 3.0 wt. % to about 15.0 wt. %.

7. The roofing product of claim 1, wherein the roofing product is selected from the group consisting of asphaltic roofing products, metal roofing products, synthetic roofing products, and polymeric roofing products.

8. The roofing product of claim 7, wherein the roofing product is selected from the group consisting of shingle roofing products, tile roofing products, and membrane roofing products.

9. A roofing product comprising roofing granules, wherein the roofing granules comprise:
   base particles, wherein the base particles are sintered and have a solar reflectance of greater than about 0.25, as measured by ASTM C1549; and
   a coating covering the base particles, wherein the coating has a depth of penetration into an outside surface of the base particles of at least about 2.5 microns into the base particles and wherein a solar reflectance of the coated base particles is decreased by about 0.20 or less, compared to the base particle without the coating.

10. The roofing product of claim 9, wherein the depth of penetration into the outside surface is not greater than about 50 microns.

11. The roofing product of claim 9, wherein the coating comprises an outer portion that has not penetrated into the base particles.

* * * * *